United States Patent [19]
Jourdan et al.

[11] Patent Number: 5,914,795
[45] Date of Patent: Jun. 22, 1999

[54] METHOD OF AND DEVICE FOR AMPLIFYING CHANNELS EXTRACTED FROM A WAVELENGTH DIVISION MULTIPLEX

[75] Inventors: Amaury Jourdan, Savigny sur Orge; Bertrand Desthieux, Paris, both of France

[73] Assignee: Alcatel Cit, Paris, France

[21] Appl. No.: 08/837,917

[22] Filed: Apr. 11, 1997

[30] Foreign Application Priority Data

Apr. 12, 1996 [FR] France .................................. 96 04604

[51] Int. Cl.⁶ ...................................................... H04J 14/08
[52] U.S. Cl. ........................... 359/134; 359/341; 359/161
[58] Field of Search .................... 359/124, 128, 359/134, 160–161, 341

[56] References Cited

U.S. PATENT DOCUMENTS

| 5,642,215 | 6/1997 | Suzuki et al. | 359/161 |
| 5,706,125 | 1/1998 | Nakano | 359/161 |

FOREIGN PATENT DOCUMENTS

| 0242802A2 | 10/1987 | European Pat. Off. . |
| 0695050A1 | 1/1996 | European Pat. Off. . |

OTHER PUBLICATIONS

Patent Abstracts of Japan, vol. 017, No. 261 (E–1369), May 21, 1993, corresponding to JP–A–05 003356 (NEC Corp.) dated Jan. 8, 1993.

Kyo Inoue et al, "Tunable Gain Equalization Using a Mach–Zehnder Optical Filter in Multistage Fiber Amplifiers", *IEEE Photonics Technology Letters*, vol. 3, No. 8, Aug. 1, 1991, pp. 718–720.

*Primary Examiner*—Kinfe-Michael Negash
*Attorney, Agent, or Firm*—Sughrue, Mion, Zinn, Macpeak & Seas, PLLC

[57] ABSTRACT

To optimize the amplification in a device for extracting channels from a wavelength division multiplex, the following steps are carried out in succession: a first amplification step with a first gain, a wavelength selection step, and a second amplification step with a second gain. The first and second gains respectively confer upon the output optical signal a fixed signal to noise ratio and a particular optical power. Applications include optical transmission networks.

10 Claims, 3 Drawing Sheets

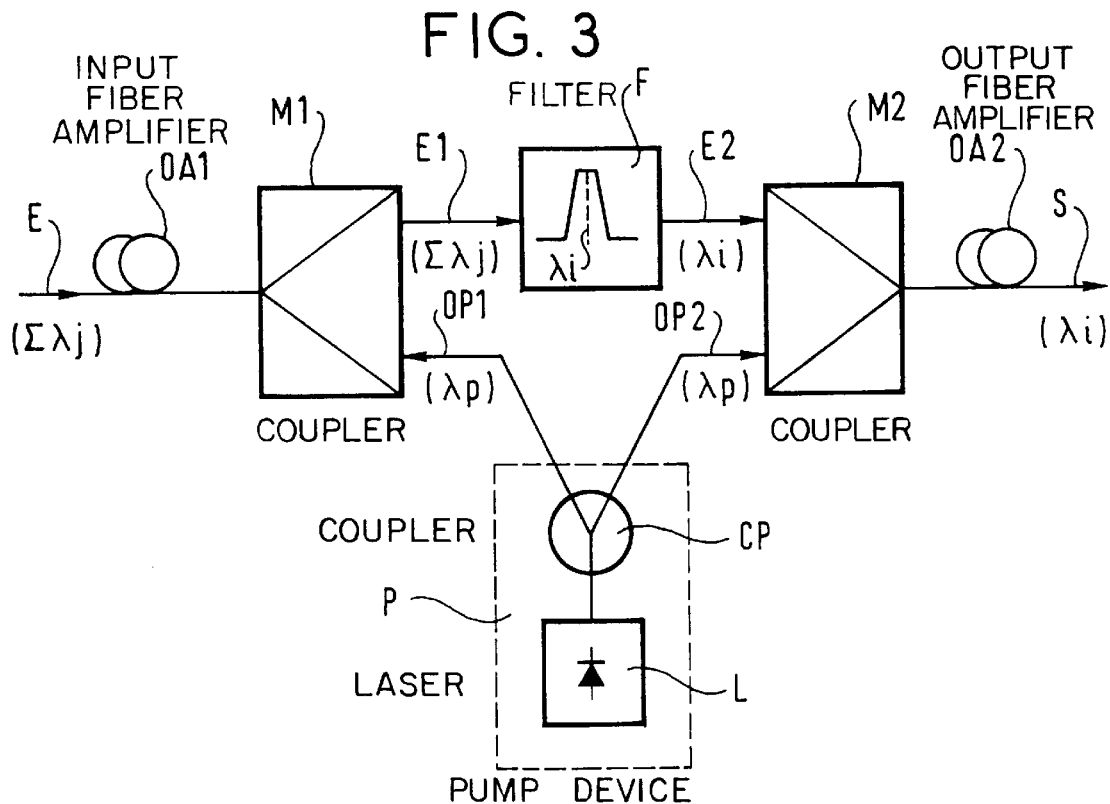
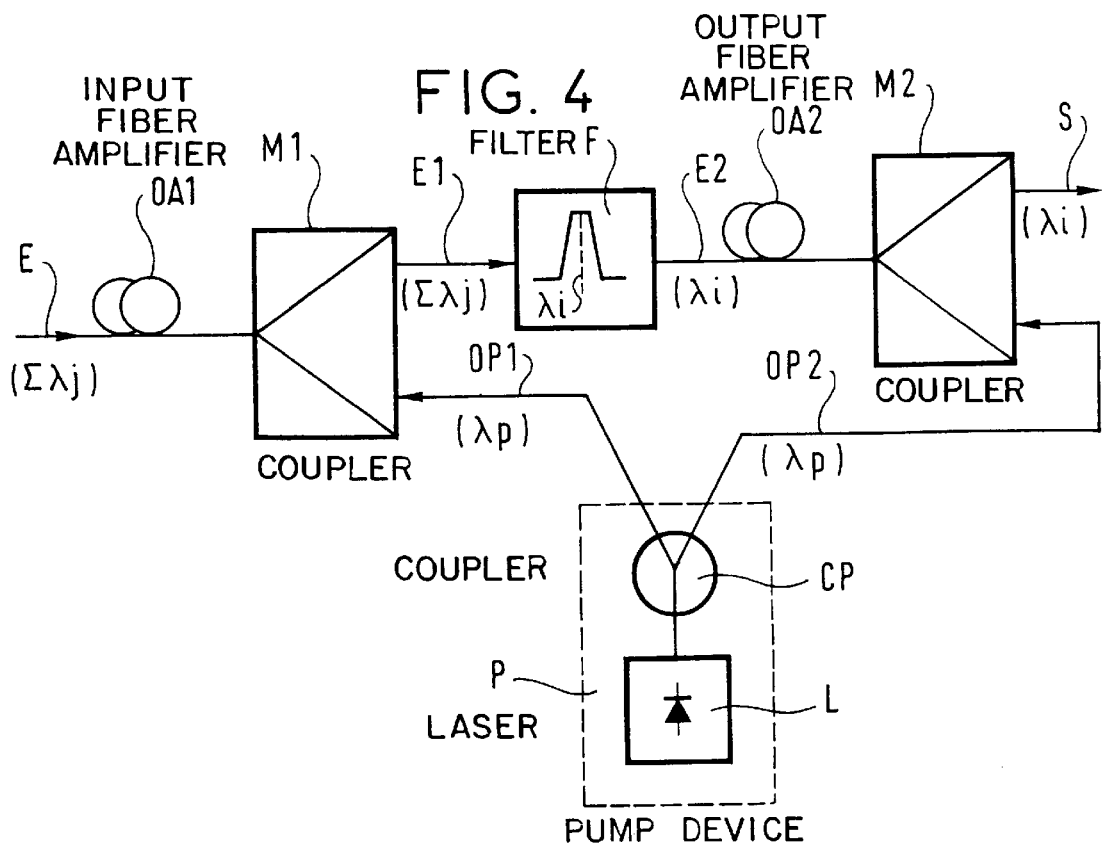

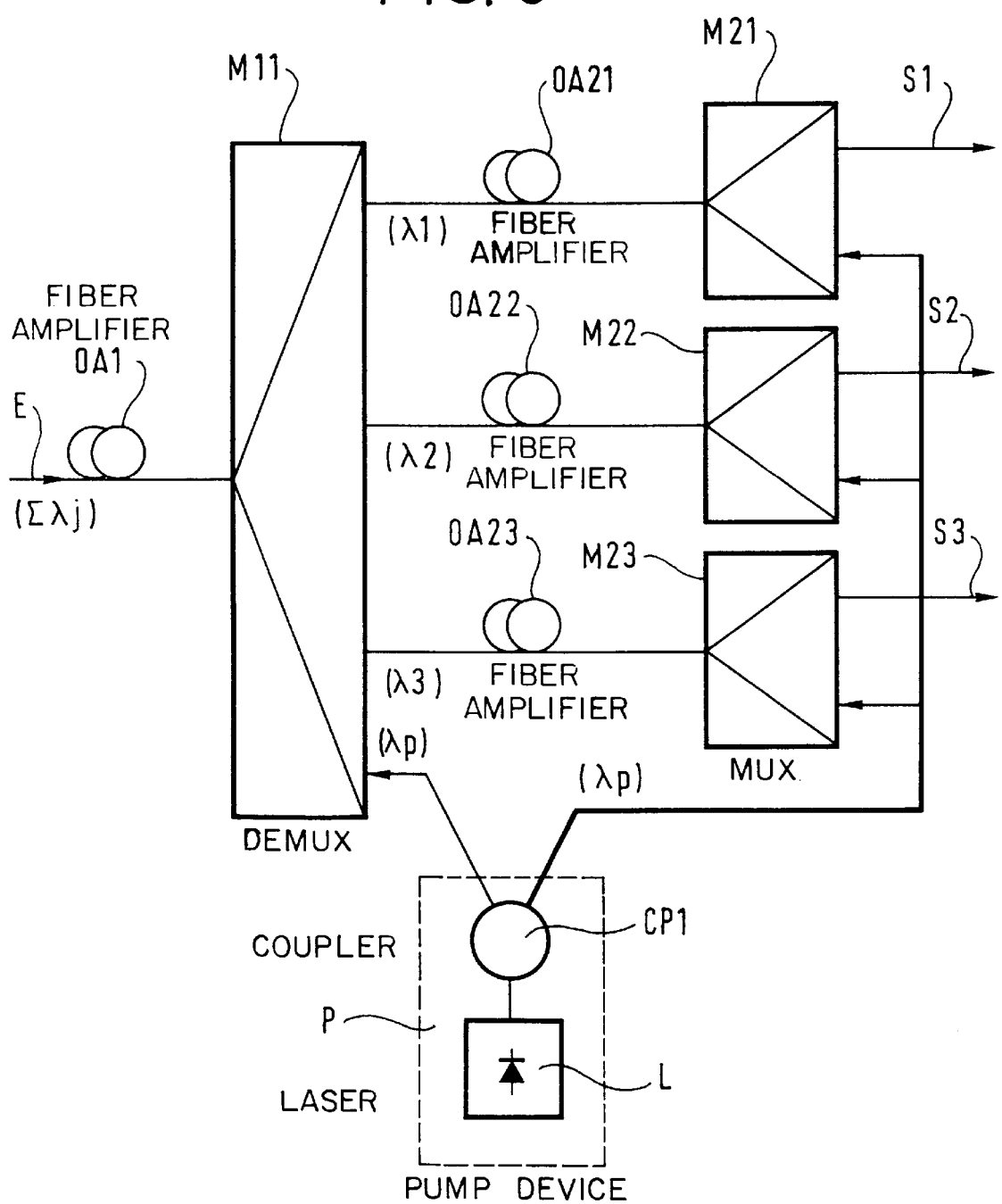

METHOD OF AND DEVICE FOR AMPLIFYING CHANNELS EXTRACTED FROM A WAVELENGTH DIVISION MULTIPLEX

BACKGROUND OF THE INVENTION

1. Field of the Invention

The invention concerns optical communications using wavelength division multiplexing (WDM).

2. Description of the Prior Art

In this type of communication, a plurality of information channels carried by different wavelengths are conveyed simultaneously in optical links. The invention is more particularly concerned with receiving and extracting one or more channels of a multiplex of this kind.

Channel extraction is effected in the routing nodes of an optical network, for example. In order to switch one of the channels of the multiplex received by the node to a particular optical link, that channel is extracted by filtering, for example using a demultiplexer or a tunable filter tuned to the wavelength of the channel, after which the wavelength of the carrier is modified using a wavelength converter to a value associated with the required link.

However, all optical filtering introduces power losses due to the filter itself and the filter input and output coupling means. A filter device therefore produces attenuation that generally has to be compensated by amplification. An optical amplifier is used for this, for example, having a gain at least equal to the attenuation coefficient of the filter, the attenuation coefficient being defined as the ratio (greater than unity) of the input optical power to the output optical power of the filter.

The drawback of such amplification is that it is always accompanied by a degraded signal to noise ratio of the optical signal obtained. This is due to the fact that an optical amplifier generates noise that is substantially proportional to its gain, known as "amplified spontaneous emission" or "ASE". To compensate the attenuation of an optical device with the signal to noise ratio degraded as little as possible, it is necessary to place the amplifier on the input side of the attenuator device. In this case the signal to noise ratio is not degraded by the attenuation, as would be the case if the amplifier were on the output side.

However, in the case of filtering, the solution that provides the best signal to noise ratio is not optimal from the point of view of use of the amplification means. By definition, filtering to extract some channels from a multiplex eliminates the other channels. As a result, the increase in power applied by the amplifier to the channels that are thereafter eliminated by filtering is of no utility.

An aim of the invention is therefore to propose a solution that optimizes the amplification means. For this, account is taken of the fact that it is not always essential for the signal to noise ratio of the amplified and filtered signal to be the best possible ratio. In practise, a limit value of the signal to noise ratio can be set that is sufficient for subsequent processing of the signal. Likewise, the optical power necessary for such processing can be evaluated.

SUMMARY OF THE INVENTION

To be more precise, the invention consists in a method of extracting and amplifying at least one channel from a wavelength division multiplex in order to obtain from an input optical wave representing the multiplex at least one output optical wave including some of the spectral components of the multiplex, wherein to confer upon the spectral components of each output wave a signal to noise ratio at least equal to a fixed limit value and a particular optical power, the method includes:

a first amplification step applying a first gain to the input wave to supply a preamplified wave, a wavelength selection step applied to the preamplified wave to obtain at least one filtered wave, and a second amplification step applying a second gain to each filtered wave to produce a corresponding output wave, and wherein the value of the first gain is insufficient to obtain the particular power but sufficient for each signal to noise ratio to be at least equal to the limit value and each second gain has a value conferring the particular power on the spectral components.

The second amplification step is advantageously effected in gain saturation mode. It is desirable for the power of the spectral components of the output wave to be not much dependent on their wavelengths.

The invention also consists in a device for implementing the method. To confer upon the spectral components of each output wave a signal to noise ratio at least equal to a fixed limit value and a particular optical power, the device includes:

an input optical amplifier adapted to receive the input wave and to supply a preamplified wave, wavelength selector means coupled to the input amplifier to receive the preamplified wave and adapted to supply at least one filtered wave, and at least one output amplifier coupled to the selector means to receive a filtered wave and supplying a corresponding output wave, and wherein the gain of the input amplifier is insufficient to obtain the particular power but sufficient for each signal to noise ratio to be at least equal to the limit value and the gain of each output amplifier has a value conferring the particular power on the spectral components.

In accordance with another aspect of the invention, amplifiers are used the gains of which are not much dependent on the wavelengths to be amplified. This property can easily be achieved with fiber amplifiers, such as fluorinated fibers or fibers doped with aluminum.

In one embodiment offering high performance and which is advantageous from the manufacturing cost point of view, the fiber amplifiers are associated with common optical pumping means.

In one embodiment, to improve the signal to noise ratio, the amplifier fiber of each output amplifier is coupled to the selector means, input coupling means are provided to feed a first pump wave into the amplifier fiber of the input amplifier and to apply the preamplified wave to the selector means, and output coupling means are provided to feed a second pump wave into the amplifier fiber of each output amplifier and to extract therefrom the corresponding output wave.

Other aspects and advantages of the invention will emerge from the remainder of the description which is given with reference to the accompanying drawings.

BRIEF DESCRIPTION OF THE DRAWINGS

FIG. 3 shows a first embodiment using fiber amplifiers.

FIG. 4 shows a preferred variant.

FIG. 5 shows another variant for simultaneous extraction of a plurality of channels.

DETAILED DESCRIPTION OF THE PREFERRED EMBODIMENTS

Figure 1:
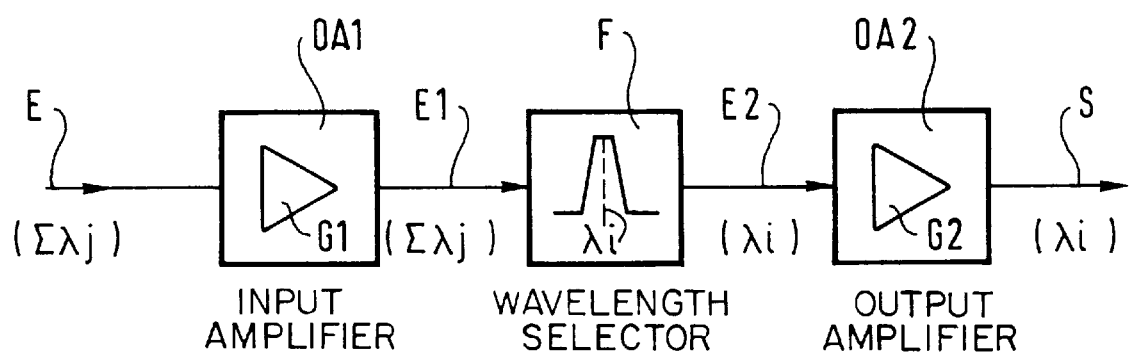
FIG. 1 is a block schematic of the device of the invention.

FIG. 1 is a schematic showing a device in accordance with the invention for extracting channels from a wavelength division multiplex. To simplify the description, this example applies to the extraction of a single wavelength λi from the multiplex Σλj.

The device includes an input amplifier OA1 coupled to the input of a wavelength selector F the output of which is coupled to an output amplifier OA2. The amplifier OA1 receives the multiplex in the form of an input optical wave E that contains a plurality of spectral components with wavelengths λ1, λ2, ..., λj, ... λn. The amplifier OA1 supplies to the selector F a preamplified wave E1 containing the same spectral components as the input wave E. The selector F, which is a filter tuned to one of the wavelengths λi of the input multiplex, for example, supplies the filtered wave E2 to the output amplifier OA2. The output amplifier OA2 supplies an output wave S that includes only the spectral component λi.

In accordance with the invention, the values of the respective gains G1, G2 of the amplifiers OA1, OA2 are determined in the following manner. The optical power Ps required for the channel to be extracted, i.e. for the spectral component λi at the output of the device, is known. The minimal power of the spectral components of the input wave E can be estimated. Finally, the attenuation coefficient A characteristic of the filter and of the coupling between the filter and the two amplifiers can be determined. It is therefore possible to deduce the value of the product G1.G2 of the gains of the amplifiers OA1 and OA2.

The value R of the signal to noise ratio of the output spectral component is set. This value R enables the value of G1 to be determined. The product G1.G2 being known, the value of G2 is deduced from it.

The exact values of the gains G1 and G2 can be determined experimentally or by simulation, allowing for the characteristics of the amplifiers used.

These gain values can also be evaluated approximately by direct calculation. To do this, it is assumed that the ratio α of the amplified spontaneous emission (ASE) power to the gain of the amplifiers used is a known constant. In this case, neglecting the input signal noise:

Input power per channel=Pe
Output power of selected channel Ps=G1.G2.Pe/A
Noise power due to OA2=α.G2
Noise power due to OA1=α.G1.G2/A
S/N ratio at output R=(Pe/α)/(1+A/G1)

The expression for R shows that the output signal to noise ratio can be set by an appropriate choice of the value of the gain G1 only. The conclusion would be the same if account were taken of the noise present in the input signal.

By way of comparison, if amplification were effected only on the input side of the filter the following would apply: R=Pe/α.

On the other hand if the amplification is affected only on the output side of the filter: R=Pe/(αA).

The solution proposed by the invention is therefore a compromise which allows for the fact that in practise a signal to noise ratio slightly lower than the maximal value Pe/α can be acceptable. However, the saving in terms of amplification resources increases in direct proportion to the number of input channels. Higher output powers can be obtained in this way.

The gain values of the amplifiers will in practise be obtained by appropriate dimensioning, in combination with an adjustment of the optical or electrical pumping, depending on whether the amplifiers are fiber amplifiers or semiconductor amplifiers.

If the filter F is a wavelength-tunable filter, or in the context of standardized production, it is advantageous to render the device not much dependent on the selected channels, i.e. to render it insensitive to any spread of the power levels of the spectral components. This could be achieved by choosing an output amplifier rated to operate in gain saturation mode, so as to equalize the output power. In addition, the value of the gain G1 could also be modified so that the power applied to the input of the output amplifier is sufficient to saturate it.

Figure 2:
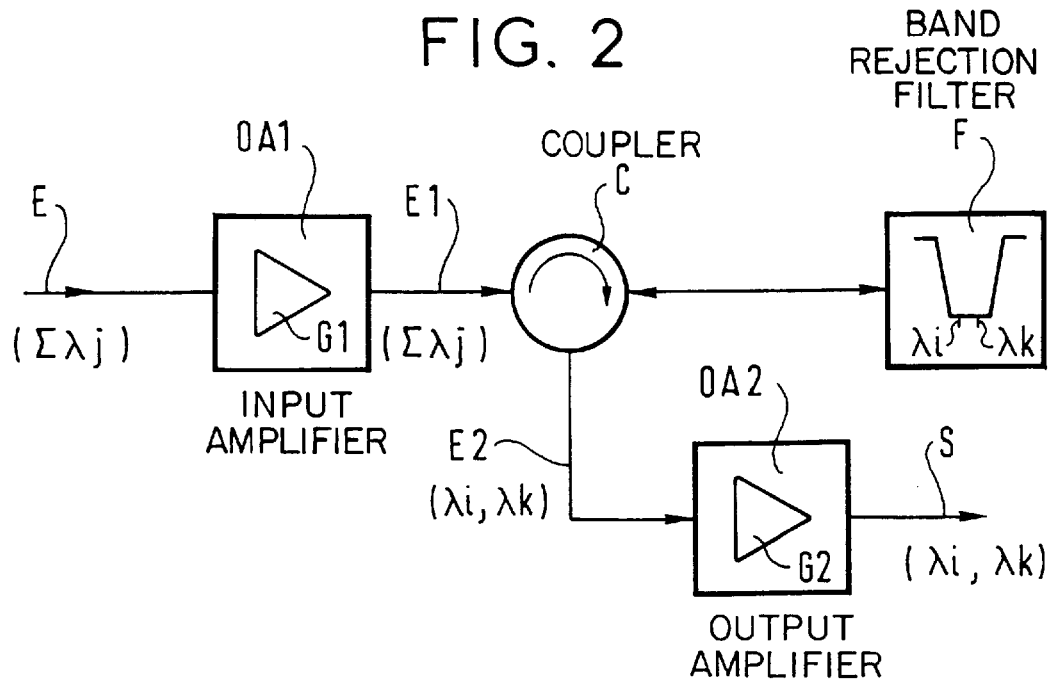
FIG. 2 shows a variant using a band rejection filter.

FIG. 2 is a variant showing that the invention may be applied to devices selecting a plurality of wavelengths and/or using reflection filters.

In this variant, the input amplifier OA1 is coupled to a band rejection filter F by a circulator C with three input/output ports. The first two ports are coupled to the input amplifier OA1 and to the band rejection filter F, respectively, and the third port is connected to the output amplifier OA2. The band rejection filter F is chosen to reflect the wavelengths λi and λk that correspond to the channels to be extracted from the input multiplex, for example. The rules for rating the amplifiers are those just explained.

If fiber amplifiers are used, the same arrangement can be used to inject the pump waves. For this, it is sufficient for the filter F to be designed to reject the wavelength of the pump wave, which in this case would be fed to the input of the amplifier OA1, for example by means of a coupler.

Although the invention is applicable to devices provided with semiconductor optical amplifiers, in the current state of the art in the field of optical amplifiers, the amplifiers best suited to wavelength division multiplexes are fiber amplifiers, in particular fluorinated fiber amplifiers. These have the advantage of a gain that is not much dependent on the wavelength and on the number of channels to be amplified.

FIG. 3 shows a first embodiment suited to this type of amplification. The two fiber amplifiers OA1, OA2 are made up of amplifier fibers associated with pumping means P. In the implementation shown, the pumping means P are common to the two amplifiers. They comprise a pump laser L connected to a coupler CP which supplies two pump waves OP1, OP2 respectively intended for the amplifier fibers of the amplifiers OA1, OA2.

The fiber amplifiers OA1, OA2 are respectively coupled to the input and the output of the filter F by coupling means M1, M2 which also feed the respective pump waves OP1, OP2 into the amplifier fibers of the amplifiers OA1, OA2.

The coupling means M1, M2 are advantageously multiplexers-demultiplexers capable of separating the wavelength of the pump wave from those of the input multiplex and from that of the channel selected by the filter, respectively. The use of such components reduces coupling losses compared to the use of conventional optical couplers, the losses of which are typically 3 dB.

The advantage of this implementation is first and foremost that it is economical in terms of the number of components used. Further, its symmetrical construction allows for operation independent of the wave propagation direction.

However, it has the drawback of not being optimal in so far as the signal to noise ratio is concerned, because the output multiplexer M2 introduces attenuation on the input side of the output amplifier OA2. Also, the arrangement shown in FIG. 4 may be preferable, in which the fiber amplifier of the output amplifier OA2 is coupled directly to the filter F and the output multiplexer M2 is adapted to feed the second pump wave OP2 into this amplifier fiber and to extract the output wave S. As a result, the amplified spontaneous emission noise of the amplifier OA2 is attenuated by the multiplexer M2, which reduces the signal to noise ratio of the output wave.

By way of illustration, there follow a few details concerning a practical implementation using fluorinated fiber amplifiers and a Fabry-Pérot filter:

16-channel multiplex multiplex band: 1 530 nm–1 560 nm pump wavelength: 1 480 nm attenuation of filter A: 6 dB S/N ratio at output R: 30 dB (0.1 nm bandwidth)

amplifier gain: G1=G2=16 dB input power Pe: −21 dBm output power Ps: +5 dBm the powers Pe and Ps being expressed in dBm defined as ten times the logarithm of the power expressed in milliwatts.

FIG. 5 shows another device of the invention for extracting a plurality of channels from a multiplex simultaneously.

In the example shown, three channels carried by the wavelength $\lambda 1, \lambda 2, \lambda 3$ are extracted. The input multiplex E is amplified by the amplifier OA1 and then applied to the input of a demultiplexer M11 having four outputs tuned to the wavelengths $\lambda 1, \lambda 2, \lambda 3$ and $\lambda p$. The first three outputs are connected to the output amplifiers OA21, OA22 and OA23, respectively. The fourth output receives the pump wave from the device P. The output amplifiers OA21, OA22, OA23 supply the output waves S1, S2, S3 via multiplexers M21, M22, M23 which are also used to feed the pump waves to these amplifiers.

Note that in this embodiment the demultiplexer M11 acts both as a channel selector filter and as a coupler for feeding the pump wave into the fiber amplifier OA1.

As in the FIG. 4 embodiment, the pump device P is common and the pump power is distributed to each amplifier via coupling means CP1. These coupling means may comprise a first 3 dB fiber coupler supplying half the pump power to the amplifier OA1 and the other half to a star coupler distributing this power to the output amplifiers.

Of course, the device of the invention is not limited to the few embodiments just described. It also encompasses many variants thereof that will be evident to the person skilled in the art.

There is claimed:

1. A method of extracting and amplifying at least one channel from a wavelength division multiplex input optical wave having plural spectral components to obtain at least one output optical wave including some but not all of the spectral components of said multiplex, said spectral components of each output wave having a particular optical power and a signal to noise ratio at least equal to a fixed limit value, said method including the steps of:

amplifying said input wave with a first gain to supply a preamplified wave, wavelength selecting said preamplified wave to obtain at least one filtered wave, and amplifying each filtered wave with a second gain to produce a corresponding output wave, and wherein the value of said first gain is insufficient to obtain said particular power but sufficient for each signal to noise ratio to be at least equal to said limit value and each second gain has a value conferring said particular power on said spectral components.

2. The method claimed in claim 1 wherein said second amplification step is effected in gain saturation mode.

3. A device for extracting and amplifying at least one channel from a wavelength division multiplex input optical wave having plural spectral components, to obtain at least one output optical wave including some of the spectral components of said multiplex, said device conferring upon said spectral components of each output wave a particular optical power and a signal to noise ratio at least equal to a fixed limit value, said device comprising:

an input optical amplifier adapted to receive said input wave and to supply a preamplified wave, wavelength selector means coupled to said input amplifier to receive said preamplified wave and supply at least one filtered wave having some but not all of said plural spectral components, and at least one output amplifier coupled to said selector means to receive a filtered wave and supply a corresponding output wave, wherein the gain of said input amplifier is insufficient to obtain said particular power but sufficient for each signal to noise ratio to be at least equal to said limit value, and the gain of each output amplifier has a value conferring said particular optical power on said spectral components.

4. The device claimed in claim 3 wherein the gain of said input amplifier is also sufficient for each output amplifier to operate in gain saturation mode.

5. The device claimed in claim 3 wherein said amplifiers have gains that are substantially independent of the wavelength differences of said spectral components.

6. The device claimed in claim 3 wherein said amplifiers include amplifier fibers.

7. The device claimed in claim 6 comprising common optical pumping means adapted to supply pump waves to said input and output amplifiers.

8. The device claimed in claim 6 wherein said amplifier fiber of each output amplifier is coupled to said selector means, said device including input coupling means for feeding a first pump wave into said amplifier fiber of said input amplifier and applying said preamplified wave to said selector means, and output coupling means for feeding a second pump wave into said amplifier fiber of each output amplifier and extracting therefrom said corresponding output wave.

9. The device claimed in claim 8 wherein said input and output coupling means are demultiplexers adapted to separate the wavelength of said pump waves respectively from the wavelengths of said multiplex and the wavelengths of said spectral components of said output wave.

10. The device claimed in claim 3 wherein said selector means comprise a wavelength tunable filter.

* * * * *